Dec. 8, 1931.  J. A. BARTOSZ  1,835,454
FLAX THRASHER
Filed Aug. 29, 1927   2 Sheets-Sheet 1
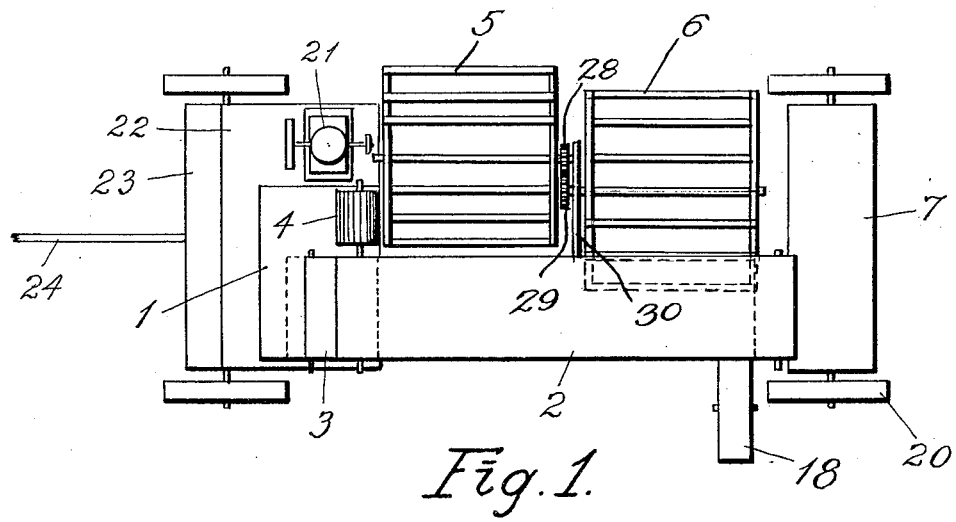
Fig.1.
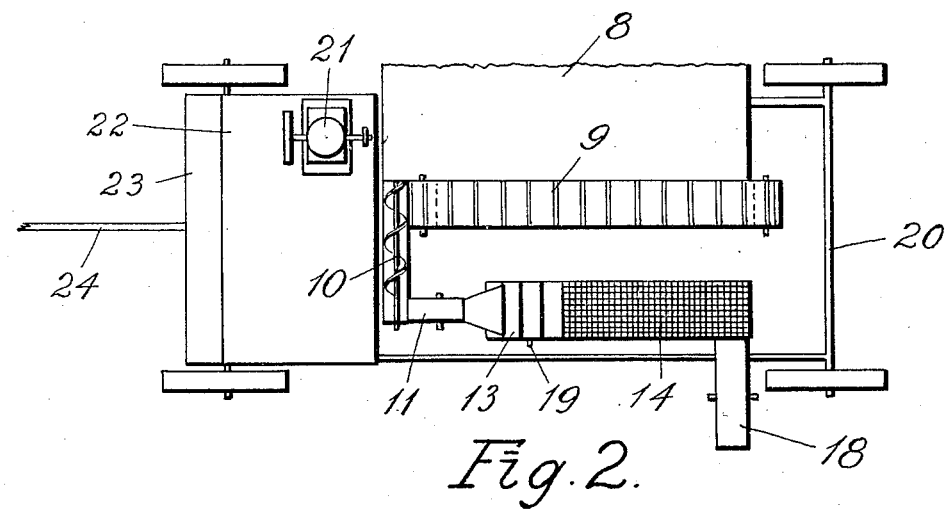
Fig.2.
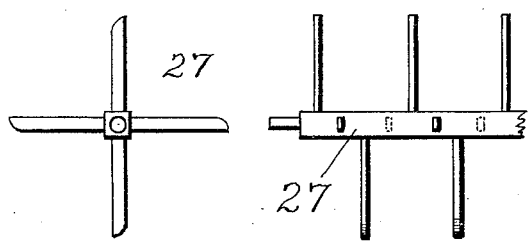
Fig.3.  Fig.4.
J. A. BARTOSZ.
Inventor
By
Attorney Dec. 8, 1931.   J. A. BARTOSZ   1,835,454
FLAX THRASHER
Filed Aug. 29, 1927   2 Sheets-Sheet 2
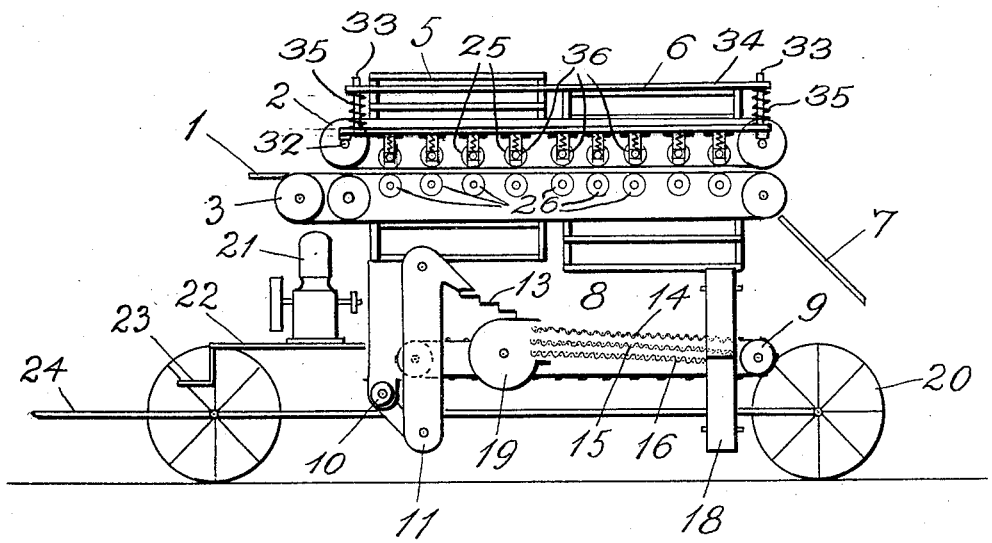
Fig. 5.
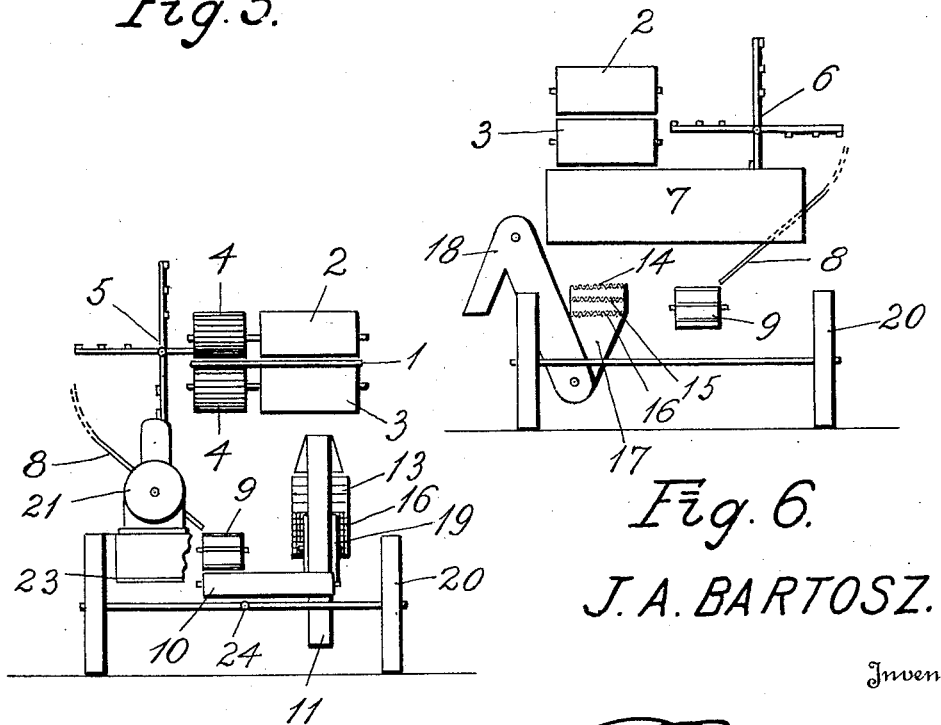
Fig. 6.
Fig. 7.
J. A. BARTOSZ.
Inventor Patented Dec. 8, 1931

1,835,454

UNITED STATES PATENT OFFICE

JOSEPH A. BARTOSZ, OF SALEM, OREGON, ASSIGNOR OF ONE-HALF TO JOE BAUMGARTNER, OF SALEM, OREGON

FLAX THRASHER

Application filed August 29, 1927. Serial No. 216,018.

My invention relates to flax-thrashers, in which an engine, draper belts, crushing rollers, reels, a conveyer belt, a screw conveyer, an elevator, a shaking screen, a blower, and a sacker are all mounted on a wagon.

The objects of my invention are to provide a flax thrasher which can conveniently be transported from one flax field to another, which receives the flax stalks, removes the seed, delivers the stalks undamaged to a binder, and the cleaned flax seed to a sacker.

Other objects and advantages are to be found in the construction and arrangement of parts, as will be described in the specification and particularly pointed out in the appended claim.

I attain these objects with the mechanism, illustrated in the accompanying drawings, in which:

Fig. 1 is a plan view of the entire apparatus.

Fig. 2 is a plan view of the machinery below the draper belts and reels.

Fig. 3 is an end view of my alternate beater construction.

Fig. 4 is a side view of Fig. 3.

Fig. 5 is a side view of Fig. 1.

Fig. 6 is a rear view of the flax thrasher, and

Fig. 7 is a front view thereof.

Similar numerals refer to similar parts throughout the several views.

The flax thrasher is shown in more or less diagrammatic form, and to illustrate the principle of my invention more clearly, the supporting, driving, and enclosing members, which are within the province of the skilled mechanic and whose insertion would only tend to obscure the important parts, have largely been omitted.

The bundles of flax as received from the field are opened on the table 1 and the stalks are delivered in a thin layer to the two draper belts 2 and 3. The seed pods are cracked between the two rollers 4 which are covered with corrugated rubber. The stalks are then carried past the two reels 5 and 6 of which the first one 5 is mounted a little higher than the line of travel, and beats down upon the stalks, while the second reel 6 is mounted a little below the line of travel and beats against the head of the flax from below. After passing the reels 5 and 6 the flax stalks are permitted to slide down an incline 7 to a binder. In the meantime the seed pods which have been separated from the stalks slide down a chute 8 under the reels 5 and 6 to a cleated belt conveyer 9 which carries hulls and seeds toward the front into a short screw conveyer 10. A small elevator 11 takes the seed from the screw conveyer 10 and delivers the same onto a shaking screen. This shaking screen is composed of a plurality of solid steps 13 on which the seeds are spread out into a thin even layer and then delivered to three superimposed screens, the first or top screen 14 retaining the hulls and bits of stalks, the second or intermediate screen 15 passing the flax seed but retaining the coarse weed seed and chaff, and the third or fine screen 16 passing all fine weed seed but retaining the flax seed which is shaken into a hopper 17 and from there conveyd to a sacker 18 ready to be deposited into sacks. A blower 19 at the front end of the three screens 14, 15, and 16 and below the steps 13 assists in the thorough cleaning of the flax seed. Care should however, be taken that the current of air from the blower is chiefly directed against the underside of the screens 14, 15 and 16 in order to avoid a packing of the seed on the screens. All this machinery is mounted in a suitable manner on a wagon 20 ready for transportation from one field to the other. The engine 21 is preferably mounted on a platform 22 at the front end of the wagon 20 and furnishes the small yet numerous drives for all the moving machinery. The step 23 on the wagon enables the operator to reach the table 1 with greater convenience.

The tongue at the front of the wagon 20 is indicated by the numeral 24.

The upper draper belt 2 should be mounted in yielding bearings so that entire bundles can be fed to the draper belts if necessary. A plurality of idlers 25 and 26 within the upper and lower draper belts respectively insure a firm grip on the flax stalks under the action of the reels. The idlers 25 in the upper draper belt are also mounted in individually yielding bearings to insure uniformly good results even where the layer of flax stalks is of uneven thickness.

It has already been mentioned that this machine will also handle entire bundles, but in that case it is preferable to substitute for the reel the beater 27 shown in Figs. 3 and 4 which is better adapted to penetrate flax in bundles.

Fig. 1 also illustrates how a gear 28 on the reel 5 meshes with a gear 29 on the reel 6, so that a rotation of the reel 5 in one direction induces in the reel 6 automatically a rotation in opposite directions. The supporting post between the two reels is indicated by the numeral 30.

Fig. 5 also illustrates the yielding bearings for the upper draper belt 2 and the idle rollers briefly designated as idlers 25. On each side of the draper belt 2 is a beam 31 to which the bearing 32 for the draper belt 2 is attached. On top of the beam 31 is a vertical rod 33 which is slidably mounted in a rigid overhead frame 34. Around the rod 33, between the beam 31 and the frame 34 is a spring 35 which presses the upper draper belt 2 against the lower draper belt 3. At the under side of the beam 31 are the spring bearings 36 for the idlers 25. In this way the idlers help to press the upper against the lower draper belt, yet are enabled to yield individually if necessary.

Having thus described my invention it will be seen that my objects have been accomplished, and, though I have shown the preferred form of construction, I reserve to myself the right to make minor changes, providing I do not contravene the spirit and principle of my invention.

I claim:

In a flax thrasher, the combination of two cooperatively mounted draper belts, crushing rollers of corrugated rubber at the side of the draper belts, two rotating reels at the side of the draper belts and rearwardly of the crushing rollers, said reels rotating in opposite directions, said reels separating the seeds from the stalks, means to clean said seed and deliver the cleaned seeds at the side of the draper belts.

In testimony whereof I affix my signature.

JOSEPH A. BARTOSZ.